US010053228B2

(12) United States Patent
Kahn et al.

(10) Patent No.: US 10,053,228 B2
(45) Date of Patent: Aug. 21, 2018

(54) AIRCRAFT STATUS REPORT MATCHING

(71) Applicant: General Electric Company, Schenectady, NY (US)

(72) Inventors: Robert Samuel Kahn, Cincinnati, OH (US); Laird Eldon Becker, III, West Chester, OH (US); Michael Dean Fullington, West Chester, OH (US); Roopa Gidugu, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/386,440

(22) Filed: Dec. 21, 2016

(65) Prior Publication Data

US 2018/0170574 A1    Jun. 21, 2018

(51) Int. Cl.
*G01C 21/00* (2006.01)
*B64D 45/00* (2006.01)
*G07C 5/08* (2006.01)

(52) U.S. Cl.
CPC .......... *B64D 45/00* (2013.01); *G07C 5/0841* (2013.01)

(58) Field of Classification Search
CPC .. G08G 5/0013; G08G 5/0008; G08G 5/0021; G08G 5/0034; G08G 5/0047; G08G 1/00; G01C 21/20; G01W 1/06; G06Q 10/00
See application file for complete search history.

(56) References Cited

U.S. PATENT DOCUMENTS

| | | | | |
|---|---|---|---|---|
| 6,278,965 B1* | 8/2001 | Glass | ................. | G06Q 10/025 701/120 |
| 8,280,702 B2* | 10/2012 | Herman | ................. | G08G 5/006 701/301 |
| 8,686,878 B2* | 4/2014 | Whitlow | ................. | G08G 5/0013 340/945 |
| 8,909,158 B2* | 12/2014 | O'Connor | ......... | H04B 7/18506 340/961 |
| 9,003,085 B2* | 4/2015 | Saugnac | ............. | G08G 5/0021 710/62 |
| 9,706,563 B2* | 7/2017 | Papp | ..................... | H04W 72/10 |
| 2012/0197516 A1* | 8/2012 | Shukla | ................. | G08G 5/065 701/120 |
| 2012/0245834 A1* | 9/2012 | Klooster | ............. | G08G 5/0034 701/120 |

(Continued)

*Primary Examiner* — Shirley Lu
(74) *Attorney, Agent, or Firm* — GE Global Patent Operation; Nitin Joshi (57) ABSTRACT

The example embodiments are directed to a device and method for matching together aircraft status reports. In one example, the method includes detecting, via a user interface, a selection of an aircraft from among a plurality of aircraft that have provided aircraft status reports, determining a group of aircraft status reports, from among the received status reports, which were generated by the respective aircraft during a flight of the respective aircraft, based on metadata of the received aircraft status reports, and displaying, via the user interface, the group of aircraft status reports determined to be provided by the respective aircraft during the flight. By linking together status reports from an entire flight, analysis may be performed on data from across an entire flight instead of an individual status report thereby improving flight data analysis and subsequent actions taken based on that analysis.

20 Claims, 5 Drawing Sheets

(56) References Cited

U.S. PATENT DOCUMENTS

2014/0380433 A1* 12/2014 Yerger ................. H04L 63/107
726/4
2017/0023365 A1* 1/2017 Hunter, Jr. ............... G06T 7/74
2017/0032687 A1* 2/2017 Lamkin ................. G08G 5/065

* cited by examiner

AIRCRAFT STATUS REPORT MATCHING

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

One such industry that can benefit from cloud computing is aviation. On average, there are over 90,000 flights that occur each day originating from over 9,000 airports worldwide. At any given time there are approximately 10,000 planes in the air around the world. While an aircraft is flying, dozens or even hundreds of parameters may be continuously monitored and stored. For example, flight control inputs, throttle movement, speed and altitude, GPS location, oil pressure, system warnings, and the like, may be captured and recorded. Traditionally, aircraft data was stored in a crash-survivable flight data recorder (FDR) and was only accessed in the event of a serious incident with the aircraft. However, as technology has progressed, flight data has become more accessible. One type of flight data that is often analyzed is an aircraft status report.

SUMMARY

In an aspect of an example embodiment, provided is a computing device including a network interface configured to receive aircraft status reports provided by a plurality of aircraft, respectively, a processor configured to detect, via a user interface, a selection associated with an aircraft from among the plurality of aircraft, and determine a group of aircraft status reports, from among the received status reports, that were generated by the aircraft associated with the selection during a flight of the respective aircraft, based on metadata of the received aircraft status reports, and an output configured to output, via the user interface, the group of aircraft status reports determined to be provided by the respective aircraft during the flight.

In an aspect of another example embodiment, provided is a method for linking aircraft status reports, the method including receiving aircraft status reports provided by a plurality of aircraft, respectively, detecting, via a user interface, a selection associated with an aircraft from among the plurality of aircraft that provided the aircraft status reports, determining a group of aircraft status reports, from among the received status reports, that were generated by the aircraft associated with the selection during a flight of the respective aircraft, based on metadata of the received aircraft status reports, and displaying, via the user interface, the group of aircraft status reports determined to be provided by the respective aircraft during the flight.

In an aspect of another example embodiment, provided is a computer readable medium having stored therein instructions that when executed cause a computer to perform a method for linking aircraft status reports, the method including receiving aircraft status reports provided by a plurality of aircraft, respectively, detecting, via a user interface, a selection associated with an aircraft from among the plurality of aircraft that provided the aircraft status reports, determining a group of aircraft status reports, from among the received status reports, that were generated by the aircraft associated with the selection during a flight of the respective aircraft, based on metadata of the received aircraft status reports, and displaying, via the user interface, the group of aircraft status reports determined to be provided by the respective aircraft during the flight.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

An aircraft may generate status reports during a flight and provide the status reports to a central database for analyzing. The status reports often provide information about the aircraft and its components (e.g., engine). The status reports can be generated at any point when the engine is turned on and not just during a flight. Aircraft based status reports are often analyzed individually because there is no identifier that can link together specific reports from a single flight. Therefore, an analyst must manually sift through many reports just to find one or two that match the same aircraft on a particular flight. The example embodiments are directed to an application that identifies a plurality of aircraft status reports that belong to the same flight, and displays the status reports together via a user interface. For example, the application can sift through thousands or even millions of status reports and identify a small group of reports that are related to a particular flight of an aircraft. Accordingly, a user can view information from across aircraft status reports from an entire flight instead of viewing one status report individually. An aircraft status report provides detailed information about an aircraft and about an environment surrounding the aircraft during flight. As will be appreciated, various measurements such as speed, weight, acceleration, location, point of time, and the like, can be measured throughout a flight from takeoff to landing. Moreover, such information as a whole can be useful to analyze and base decisions rather than making a decision based on information from an isolated point in the flight.

As is described herein, a flight refers to an aircraft that departs from a departure city and lands at an arrival city and includes a single iteration. For a particular flight, an aircraft may generate status reports also referred to herein as aircraft status reports, engine status reports, and the like. A typical aircraft generates a handful of status reports, for example, five, ten, fifteen and/or the like. The status reports may be generated at any time a data recorder of an aircraft is turned on which can include anywhere between engine start and engine shutdown of the aircraft with respect to a flight and not just while the aircraft is in flight. Examples of aircraft status reports include status reports generated at engine start, takeoff, climb, cruise, landing, engine shutdown, and the like. Before a flight, during a flight (e.g., takeoff to landing), and/or after a flight, a variety of information can be detected, sensed, measured, etc. For example, an aircraft can be outfitted with one or more sensors configured to monitor respective operations or conditions of an aircraft before, during, and after a flight. Data from the sensors can be recorded or transmitted to a cloud-based or other remote computing environment. By bringing such flight data into a cloud-based computing environment, new software applications informed by industrial process, tools and know-how can be constructed, and new physics-based analytics specific to an industrial environment can be created. Insights gained through analysis of such flight data can lead to enhanced asset designs, enhanced software algorithms for operating the same or similar assets, better operating efficiency, and the like. In addition to the examples provided herein, the status reports from two separate flights may be analyzed together to determine information about the aircraft. For example, a time between engine shutdown of a first a flight and engine start of a next flight may be used to assess engine performance, and the like.

For example, flight data may be analyzed to transform the data into actionable insights that may improve safety, efficiency, and behavior of an aircraft and airline, reduce operating costs, and increase aircraft utilization. The flight data may be collected and analyzed to reveal high-risk events and trends which can enable operators to proactively and effectively manage risk. Flight data analysis is also widely used in support of maintenance and engineering of an aircraft by optimizing fuel usage, reducing emissions, and improving aircraft component life. The example embodiments improve flight data analysis because status reports from an entire flight may be analyzed together instead of analyzing a single isolated report as has been performed traditionally.

Once collected, the flight data may be transmitted to a central flight data analysis application included within a cloud computing platform for automated processing, analysis by trained personnel, and dissemination to operational managers for action. Newer systems support wirelessly downloading the data from the aircraft and getting it to the flight data analysis system without human intervention. For example, the cloud computing platform may facilitate the transmission of data, automatic and continuous processing of the data (including data filtering and organization, correlation with other data sources, and identification of significant events and measurements), human analysis of the processed data, presentation of results, and monitoring of the effectiveness of corrective actions taken based thereon.

The systems and methods for managing flight based assets described herein can include or can be a portion of an Industrial Internet of Things (IIoT) such as the Predix™ platform available from GE. In an example, an IIoT connects equipment and machine assets from industrial fields and healthcare fields, such as turbines, jet engines, healthcare machines, and locomotives, to the Internet or cloud, or to each other in some meaningful way such as through one or more networks. The systems and methods described herein can include using a "cloud" or remote or distributed computing resource or service. The cloud can be used to receive, relay, transmit, store, analyze, or otherwise process information for or about one or more assets such as aircraft.

According to various embodiments, a cloud computing system may receive aircraft status reports from thousands or even millions of flights, and identify a group or a set of aircraft status reports (e.g., 5, 8, 12, etc.) that belong to the same flight. In an example, the cloud computing system may include at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Figure 1:
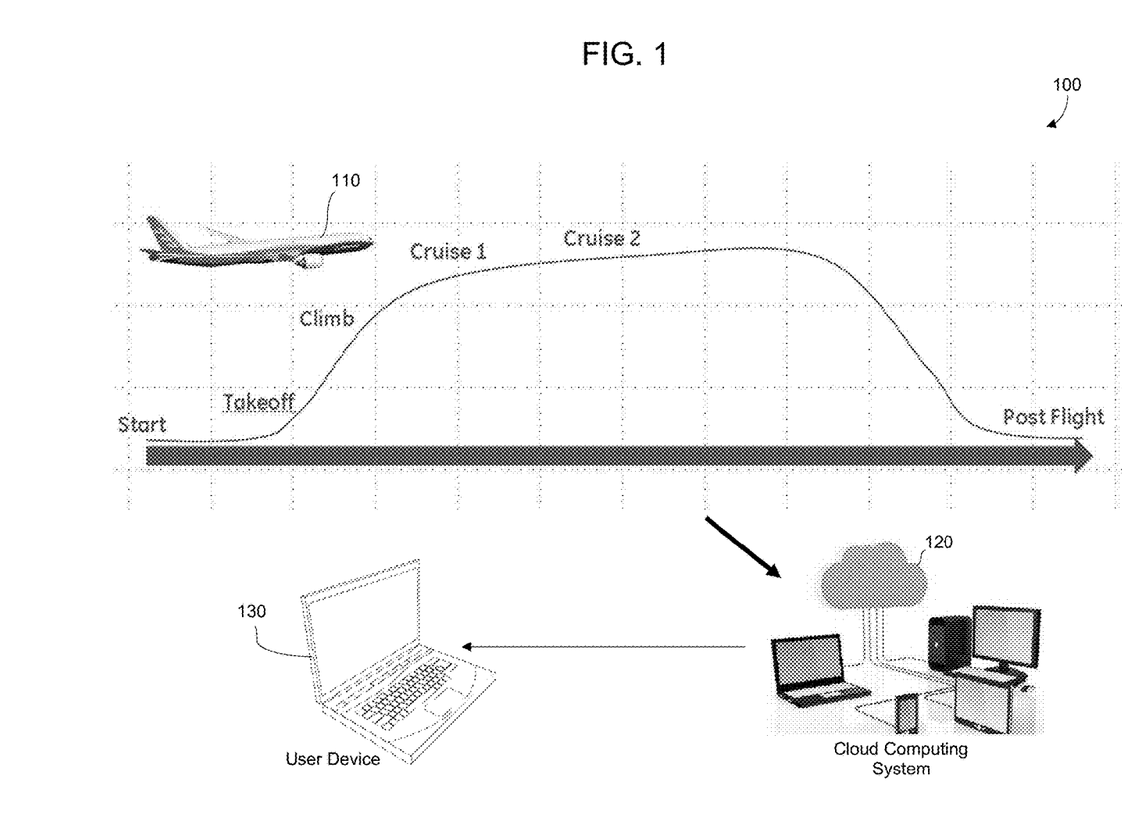
FIG. 1 is a diagram illustrating a cloud computing environment for analyzing aircraft data in accordance with an example embodiment.

FIG. 1 illustrates a cloud-based system 100 for identifying aircraft status reports that belong to a same flight, in accordance with an example embodiment. Referring to FIG. 1, the system 100 includes an aircraft 110, a cloud computing system 120 that represents a cloud-based environment according to various embodiments, and a user device 130. The aircraft 110 may include any type of aircraft that generates status reports such as commercial aircraft, military aircraft, personal aircraft, and the like. The cloud computing system 120 may be one or more of a server, computer, database, and the like, included in a cloud-based platform. In this case, the cloud computing system 120 may receive aircraft status reports from across many different flights from many different aircraft (e.g., thousands of different flights a day).

The aircraft status reports may be provided to the cloud computing system 120 directly, or they may be provided via one or more intermediate devices. In some examples, the aircraft status reports may be provided in real-time, or they may be provided after-the-fact. The aircraft status reports may be provided to the cloud computing system 120 via a network such as a private network, a public network (e.g., the Internet), or some combination thereof. In some examples, the user device 130 is also connected to the cloud computing system 120 via a network. As another example, the user device 130 may be directly connected to the cloud computing system 120, or the function of the user device may be performed by a user locally on the cloud computing system 120.

During operation, the aircraft 110 may provide a plurality of status reports from the start of the engine to the time the engine is turned off. For example, for a single flight, the aircraft may provide a group of status reports including a takeoff status report, at least one climbing status report, at least one cruising status report, a landing status report, a post flight status report, and the like. It should be appreciated that there is no limit to the amount of status reports that can be provided. Furthermore, each of the status reports may include data about the aircraft (e.g., engine data, weight, speed, etc.) and data about the environment or space including the aircraft (e.g., temperature, atmospheric pressure, weather, etc.) The status reports do not typically include express identifiers for easily and uniquely identifying a particular flight. However, the status reports may include metadata about the aircraft and a respective flight, for example, a time stamp, a departure location (e.g., city or airport) of the aircraft, destination location of the aircraft, an engine serial number (ESN), aircraft location including waypoints and/or GPS coordinates, and the like.

The example embodiments are directed to an application that may be hosted by the cloud computing system 120 and/or the user device 130, and that can analyze status reports and identify a group of status reports that belong to a same flight of a particular aircraft. For example, the group of status reports that belong to the same flight may include an engine start status report, a take-off status report, a cruise status report, a landing status report, and the like. The group of status reports may be only a handful of status reports that are detected from among aircraft status reports from thousands of flights performed by hundreds and even thousands of aircraft including other flights performed by the same aircraft on a same day. Furthermore, the application executing on the cloud computing system 120 may output the group of status reports to a display screen of the user device 130. The application may further optimize a display of the status reports from the group by arranging the status reports in a convenient and easily understandable manner by a viewer. For example, the status reports may be arranged in the order they were generated based on time stamps included in the aircraft status reports.

As is further explained with respect to FIG. 1 below, the cloud computing environment of FIG. 1 may be associated with industrial systems (i.e., flight aviation systems) in accordance with an example embodiment. In the system 100, flight data may be delivered to the cloud computing system 120 via upload, download, or any other transmissions, from the aircraft 110 (or an engine of aircraft 110) or a server that receives data from the aircraft 110 across a network or local connection. The cloud computing system 120 may reside in a local or sandboxed environment of a device such as a server, or can be distributed across multiple locations or devices and should not be construed as being limited to a single device. The system 100 can be configured to perform any one or more of data acquisition, data analysis, or data exchange with aircraft, or with other task-specific processing devices related to aviation. Although not shown in FIG. 1, the system 100 may also be connected to an asset community (e.g., turbines, healthcare, power, industrial, manufacturing, etc.) that is communicatively coupled with the cloud computing system 120.

The cloud computing system 120 may include several layers, for example, a data infrastructure layer, a cloud foundry layer, and modules for providing various functions. As a non-limiting example, the cloud computing system 120 may include an asset module, an analytics module, a data acquisition module, a data security module, an operations module, and the like. Each of the modules may include or may use a dedicated circuit, or instructions for operating a general purpose processor circuit, to perform the respective functions. The modules may be communicatively coupled within the cloud computing system 120 such that information from one module can be shared with another. As one example, the modules may be co-located at a designated datacenter or other facility, or the modules can be distributed across multiple different locations.

The user device 130 (e.g., computer, mobile device, workstation, tablet, laptop, appliance, kiosk, and the like) may be configured for data communication with the cloud computing system 120. The user device 130 can be used to monitor the aircraft 110, or flight plans, maintenance plans, repairs, and the like, for the aircraft 110. In an example, information about the aircraft 110 may be presented to an operator at the user device 130. The user device 130 can include options and hardware for optimizing one or more features of the aircraft 110 or travel schedules of the aircraft 110 based on analytics performed at the cloud computing system 120.

Although not shown in FIG. 1, the system 100 may include other devices and systems such as a device gateway that is configured to couple the aircraft 110 to the cloud computing system 120. The device gateway can further couple the cloud computing system 120 to one or more other assets or asset communities, an enterprise computing system, and/or other devices. The system 100 thus represents a scalable industrial solution that extends from a physical or virtual asset (e.g., the aircraft 110) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include an operations module. The operations module can include services that developers can use to build or test Industrial Internet applications, and the operations module can include services to implement Industrial Internet applications, such as in coordination with one or more other cloud based modules. In an example, the operations module includes a microservices marketplace where developers can publish their services and/or retrieve services from third parties. In addition, the operations module can include a development framework for communicating with various available services or modules. The development framework can offer developers a consistent look and feel and provide a contextual user experience in web or mobile applications. Developers can add and make accessible their applications (services, data, analytics, etc.) via the cloud computing system 120.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables service level agreement (SLA) mappings to underlying infrastructure. This configuration can be useful when an application requires an underlying hardware configuration. The provisioning management and pooling of resources can be done at a granular level, thus allowing optimal resource allocation. In addition, the cloud computing system 120 may be based on Cloud Foundry (CF), an open source platform as a service (PaaS) that supports multiple developer frameworks and an ecosystem of application services that provides a platform allowing customers to develop, run, and manage applications without the complexity of building and maintaining the infrastructure typically associated with developing and launching the application. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

Figure 2:
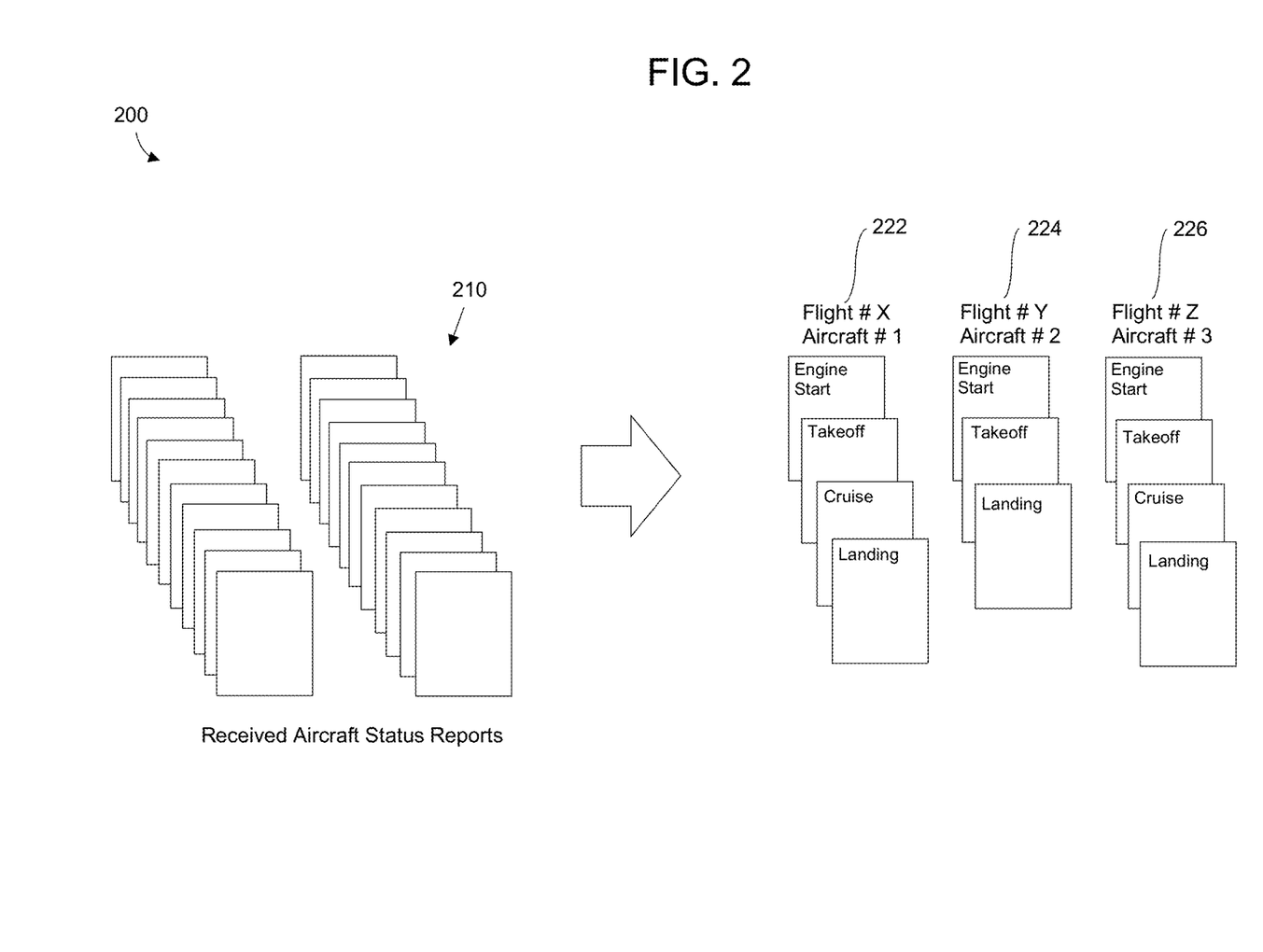
FIG. 2 is a diagram illustrating a process of displaying a group of aircraft status reports from a flight, in accordance with an example embodiment.
Figure 3:
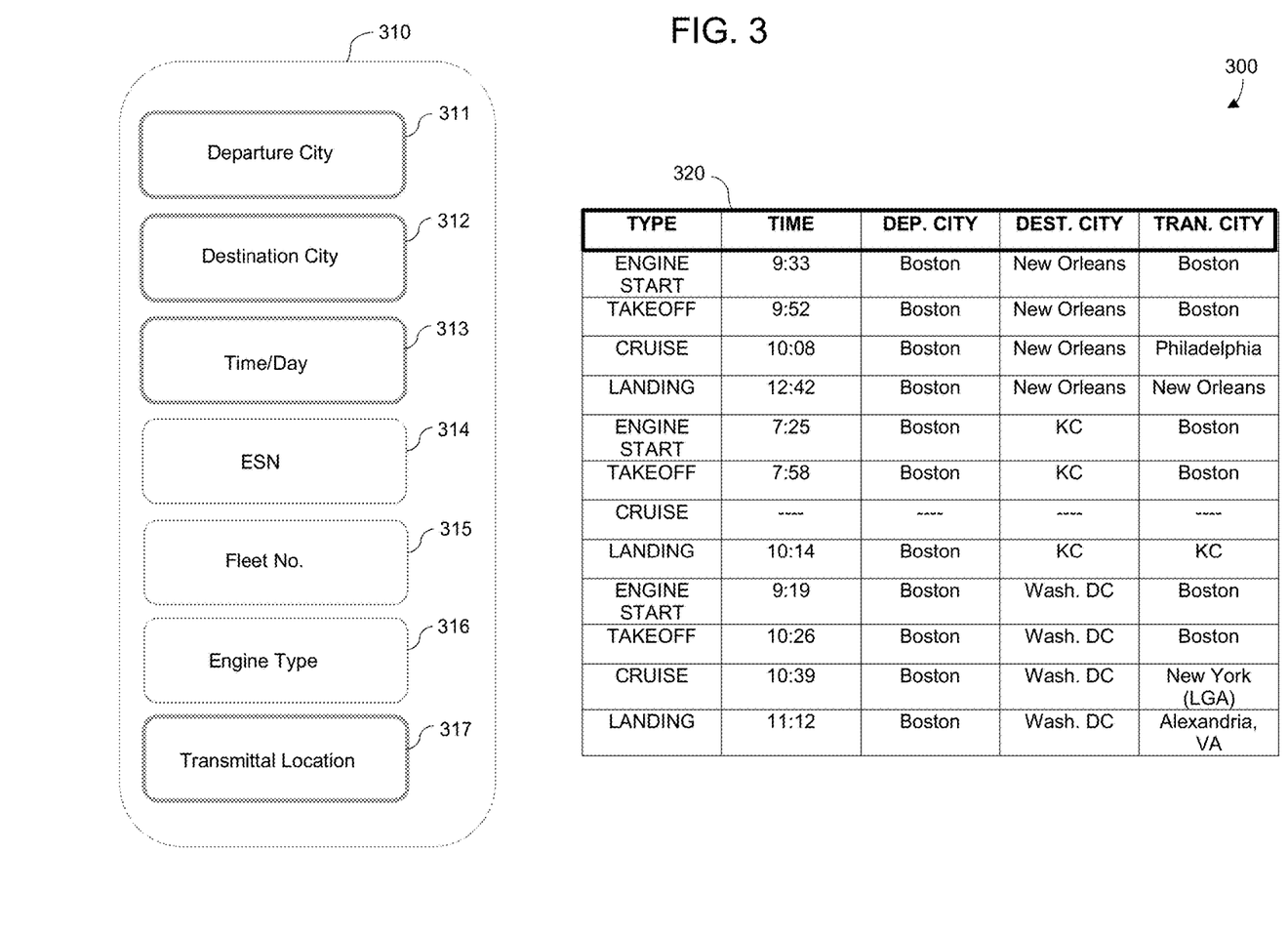
FIG. 3 is a diagram illustrating an example of a content filter that may be used to modify the content included in the group of aircraft status reports that is displayed in accordance with an example embodiment.

FIG. 2 illustrates a process 200 of determining a group of aircraft status reports that were generated by an aircraft during a flight in accordance with an example embodiment, and FIG. 3 illustrates a content filter that may be used to modify aircraft status report information that is displayed in accordance with an example embodiment. Referring to FIG. 2, aircraft status reports 210 are received from a plurality of aircraft. For example, the aircraft status reports 210 may include all status reports generated by a fleet of aircraft during a predetermined period of time (e.g., a day, a week, a month, a year, etc.). In this case, there may be thousands of aircraft status reports that each include attributes and features about an aircraft, an engine, an atmosphere, weather, time, location, and the like. In some embodiments, the aircraft status reports 210 may be received by a cloud computing platform directly from an aircraft, or via one or more relay devices, servers, routers, or the like.

According to various embodiments, the process 200 may analyze the aircraft status reports 210, for example, the data and the metadata associated with the aircraft status reports 210 and identify a group of aircraft status reports that belong to a single flight flown by a respective aircraft. In the example of FIG. 2, there is shown three flights (X, Y, and Z) which are flown by three aircraft (1, 2, and 3) respectively and they are grouped together. According to various embodiments, the application described herein may analyze the aircraft status reports and identify a set of aircraft status reports that are included in each of the three flights including Flight X 222, Flight Y 224, and Flight Z 226. In this example, Flight X 222 is flown by Aircraft 1 and generated four aircraft status reports (Engine Start, Takeoff, Cruise, and Landing). In addition, Flight Y 224 is flown by Aircraft 2 and generated three status reports (Engine Start, Takeoff, and Landing), and Flight Z 226 is flown by Aircraft 3 and generated four status reports (Engine Start, Takeoff, Cruise, and Landing). By grouping status reports together within the cloud environment, there is a further ability to run 'automated' or 'real time' analytics on the status reports as a group which is a feature that was not previously capable of being performed.

Referring to FIG. 3, a content filter panel 310 and aircraft status information window 320 are displayed via a user interface 300. The aircraft status information window 320 provides a table of aircraft data identified from the groups of aircraft status reports included in Flight X 222, Flight Y 224, and Flight Z 226, shown in FIG. 2. According to various embodiments, the type of information that is shown in the aircraft status information window 320 may be changed by a user via selections included in the content filter panel 310. In the example of FIG. 3, the user has selected content 311, 312, 313, and 317 corresponding to departure city, destination city, time, and aircraft status report transmittal location, respectively, while engine serial number 314, fleet number 315, and engine type 316 are not selected. It should also be appreciated that the content filter panel 310 is merely an example, and may be in a different form, and may include different options of content to select.

The aircraft status information window 320 displays information about the groups of aircraft status reports from the Flight X 222, Flight Y 224, and Flight Z 226. In this example, the aircraft status information window 320 includes a column for the type of aircraft status message, and columns for four types of content. Also, in the example of FIG. 2, the application may detect that Flight Y 224 is missing a status report that should have been generated by Aircraft 2. In particular, Flight Y is missing a Cruise status report. Knowing that a report is missing allows the system to account for the missing report, for example, count it, impute/interpolate the parametric data for it, etc. instead of skipping over the missing report completely as if it never existed. Also, it allows the system to prevent status reports from different flights from being incorrectly joined. Accordingly, the application may output a notification of this missing status report via the aircraft status information window 320 of the user interface 300 shown in FIG. 3. As another example, the application may simply omit an entry for the missing status report.

Figure 4:
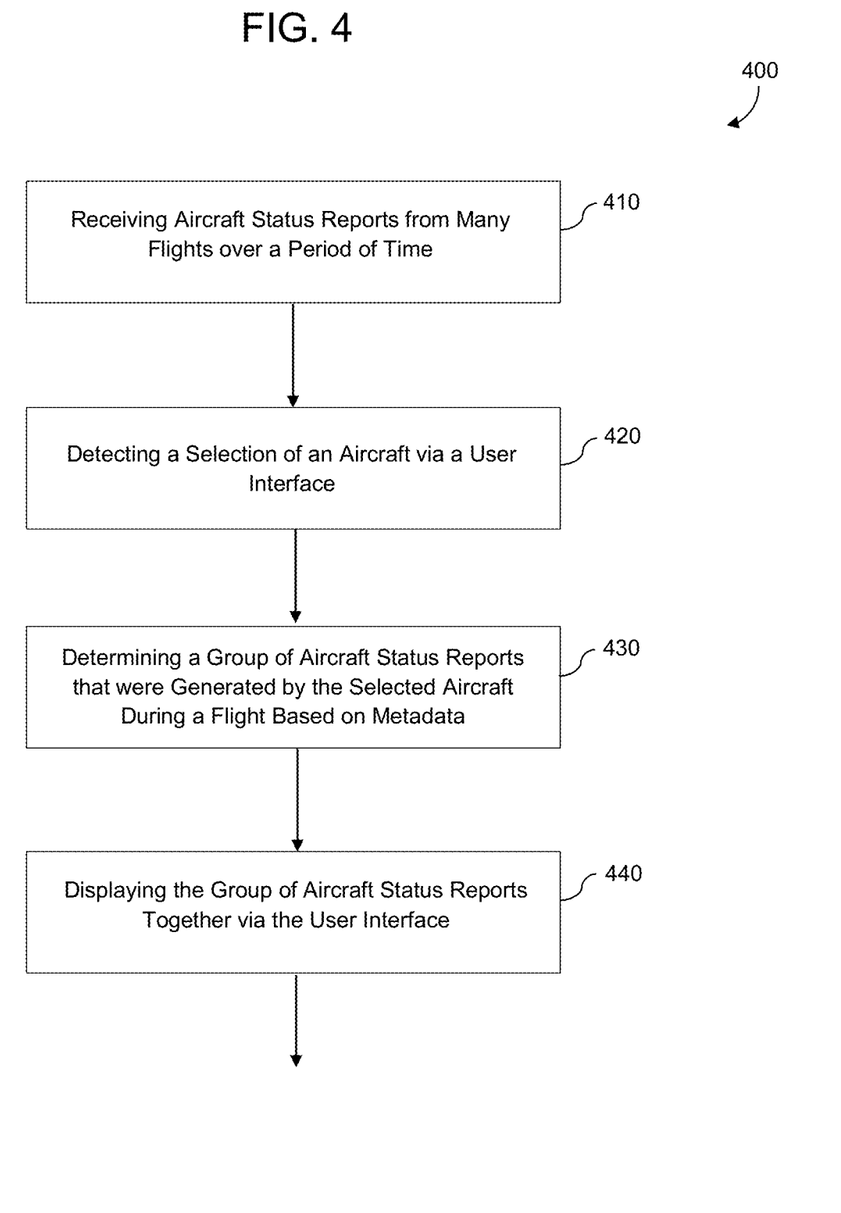
FIG. 4 is a diagram illustrating a method for linking aircraft status reports in accordance with an example embodiment.

FIG. 4 illustrates a method 400 for linking aircraft status reports together in accordance with an example embodiment. The method 400 may be performed by a computing device, for example, the cloud computing system 120 included in the system 100 of FIG. 1, or a device that is not connected to the cloud. It should also be appreciated that the method 400 may be performed by multiple devices. Referring to FIG. 4, in 410, the method includes receiving aircraft status reports provided by a plurality of aircraft, respectively. For example, thousands of aircraft may generate and provide aircraft status reports to the system. As a non-limiting example, each aircraft may generate a handful of status reports each time the aircraft flies. Accordingly, thousands of aircraft status reports may be received. The system may also display a user interface that provides a search bar, query input, or the like, allowing a user to look for status reports related to a particular flight or a particular aircraft.

In 420, the method further includes detecting, via the user interface, a selection that is associated with an aircraft from among the plurality of aircraft that provided the aircraft status reports. For example, the selection may be a selection of a particular aircraft using an engine serial number, a particular fleet of aircraft, a day, a time, an airport (e.g., destination and/or arrival), and the like. In response to the selection, in 430 the method further determines a group of aircraft status reports, from among the received status reports, which were generated by the aircraft associated with the selection during a flight of the selected aircraft, based on metadata of the received aircraft status reports detecting a group of aircraft status reports for a flight of the aircraft, a plurality of flights for the aircraft (e.g., on a particular day), and the like. In the example in which the selection is associated with multiple aircraft (e.g., a fleet of aircraft), the method may determine a group of status reports associated with a flight or flights of each aircraft among the multiple aircraft.

According to various embodiments, a group of aircraft status reports associated with a particular flight performed by a particular aircraft may include a plurality of status reports generated and provided by the respective aircraft between engine start of the aircraft and landing of the aircraft with respect to the flight. For example, the group of aircraft status reports may include one or more aircraft takeoff status reports, one or more aircraft climb status reports, one or more aircraft cruise status reports, one or more aircraft landing status reports, and the like. As a non-limiting example, the group of aircraft status reports for a particular flight may include three to twelve status reports, but the examples are not limited hereto.

The metadata of each aircraft status report may include a location at which the aircraft status report was generated (i.e., a city, town, geographical coordinates, etc.) by the respective aircraft and a time stamp. In this example, the determining in 430 may include determining the group of aircraft status reports generated by the selected aircraft during the respective flight based on locations and time stamps of the received aircraft status reports. In some examples, the determining may further include predicting a location of the respective aircraft from takeoff to landing with respect to the flight based on previous flights, and comparing the predicted location and time to a location and a time stamp included in each of the received aircraft status reports to determine the group of aircraft status reports generated by the respective aircraft during the respective flight.

In 440, the method further includes displaying, via the user interface, the group of aircraft status reports determined to be provided by the selected aircraft during the flight. For example, the displaying may include grouping together the group of aircraft status reports generated by the selected aircraft during the respective flight on the user interface beginning with a first received aircraft status report of the flight to a last received aircraft status report of the flight.

Although not shown in FIG. 4, the method may further include comparing data from the group of aircraft status reports generated by the selected aircraft during the respective flight to determine at least one notification for the aircraft, and outputting the notification via the user interface. For example, the method may analyze data over the entire flight instead of just data from a single status report to perform enhanced analytics on the flight. As another example, the method may further include identifying an aircraft status report that is missing from the determined group of aircraft status reports generated by the selected aircraft, and outputting an indication of the missing aircraft status report via the user interface. For example, the method may look for a particular group of status reports from each flight, and in a case in which one of the status reports is not found, the method may output an indication of the missing status report.

Figure 5:
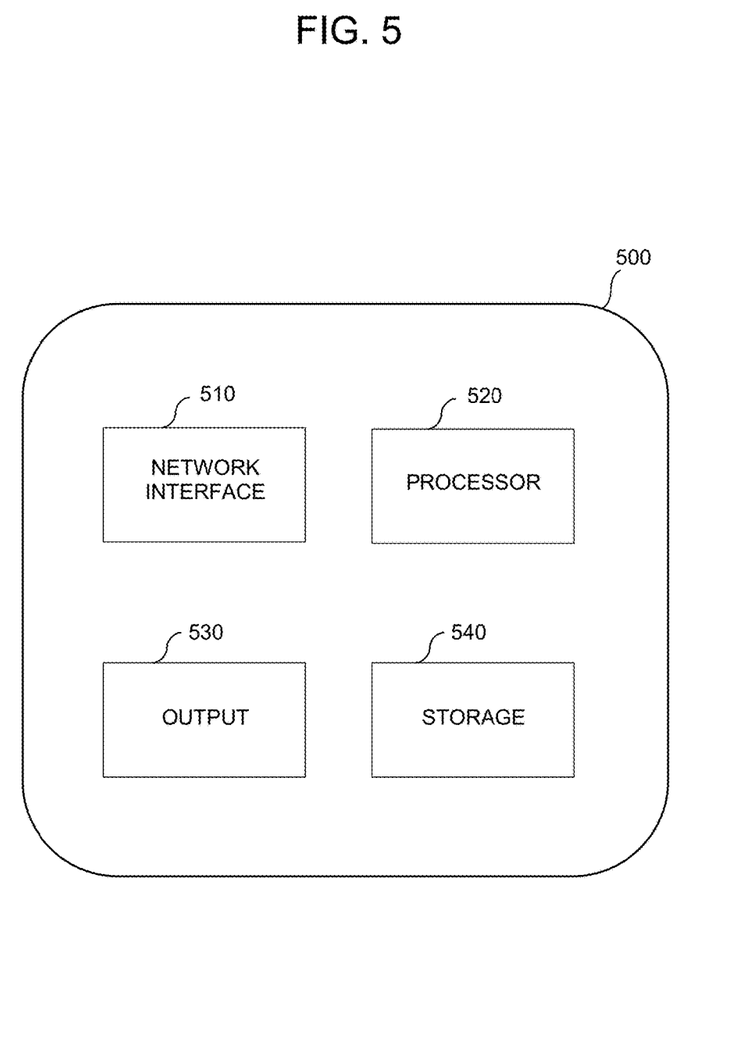
FIG. 5 is a diagram illustrating a computing device for linking aircraft status reports in accordance with an example embodiment.

FIG. 5 illustrates a computing device 500 for linking aircraft status reports in accordance with an example embodiment. For example, the computing device 500 may perform the method of FIG. 4. Referring to FIG. 5, the computing device 500 includes a network interface 510, a processor 520, an output 530, and a storage device 540. Although not shown in FIG. 5, the device 500 may include other components such as a display, an input unit, a receiver/transmitter, and the like. In some examples, the computing device 500 is a cloud computing device, although the embodiments are not limited thereto.

The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud, another device, and the like. The storage device 540 is not limited to any particular storage device and may include any known memory device such as RAM, ROM, hard disk, and the like.

According to various embodiments, the network interface 510 may receive aircraft status reports provided by a plurality of aircraft, respectively. The storage 540 may store the received aircraft status reports and the output 530 may output a user interface to a display device such as an embedded display of the computing device 500 or a display of a device that is connected to the computing device 500 via a network or a direct connection. The user interface may allow a user to make selections of flights or other flight information in order to search for flight data. The processor 520 may detect, via the user interface, a selection associated with an aircraft from among the plurality of aircraft, and determine a group of aircraft status reports that were generated by the aircraft associated with the selection during a flight of the respective aircraft, based on metadata of the received aircraft status reports. For example, the group of aircraft status reports may include a plurality of status reports (e.g., 5-15) generated and provided by the respective aircraft between engine start of the aircraft and landing of the aircraft with respect to the flight. As a non-limiting example, a group of aircraft status reports from a particular flight may include an aircraft takeoff status report, an aircraft climb status report, an aircraft cruise status report, and an aircraft landing status report.

The output 530 may output, via the user interface, the group of aircraft status reports determined to be provided by the respective aircraft during the flight. For example, the output 530 may group together the group of aircraft status reports generated by the respective aircraft during the respective flight on the user interface beginning with a first received aircraft status report of the flight to a last received aircraft status report of the flight.

The metadata included in each aircraft status report may indicate a location at which the aircraft status report was generated and also include a time stamp representing a time at which the aircraft status report was generated. The processor 520 may determine the group of aircraft status reports generated by the respective aircraft during the respective flight based on locations and time stamps of the received aircraft status reports. In some examples, the processor 520 may further predict a location of the respective aircraft from takeoff to landing with respect to the flight based on previous flights, and compare the predicted location and time to a location and a time stamp included in each of the received aircraft status reports to determine the group of aircraft status reports generated by the respective aircraft during the respective flight. The processor 520 may also compare data from the group of aircraft status reports generated by the respective aircraft during the respective flight to determine at least one notification for the aircraft, and the output 530 may output the notification via the user interface. In some examples, the processor 520 may identify an aircraft status report that is missing from the determined group of aircraft status reports generated by the respective aircraft, and the output 530 may output an indication of the missing aircraft status report via the user interface.

According to various embodiments, provided is an application that identifies a plurality of aircraft status reports that have been transmitted from an aircraft during a single flight, and displays the status reports together via a user interface. As a result, a user can view information from an entire flight instead of viewing one status report individually. Accordingly, a user can identify issues and changes to the aircraft that occurred over a series of time instead of in a single snapshot of time.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device comprising:
   a network interface configured to receive aircraft status reports provided by a plurality of aircraft, respectively;
   a processor configured to detect, via a user interface, a selection of an aircraft from among the plurality of aircraft, and determine a group of aircraft status reports, from among the received status reports, that were generated by the respective aircraft during a flight of the respective aircraft, based on metadata of the received aircraft status reports;
   an output configured to display, via the user interface, the group of aircraft, status reports determined to be provided by the respective aircraft during the flight;
   wherein the metadata of each aircraft status report comprises a time stamp, a departure location, and an arrival location, and the processor is configured to determine the group of aircraft status reports generated by the respective aircraft during the respective flight based on locations and time stamps of the received aircraft status reports.

2. The computing device of claim 1, wherein the group of aircraft status reports comprise a plurality of status reports generated and provided by the respective aircraft between engine start of the aircraft and an engine shutdown of the aircraft with respect to the flight.

3. The computing device of claim 1, wherein the output is further configured to group together the group of aircraft status reports generated by the respective aircraft during the respective flight on the user interface beginning with a first received aircraft status report of the flight to a last received aircraft status report of the flight.

4. The computing device of claim 1, wherein the processor is further configured to compare data from the group of aircraft status reports generated by the respective aircraft during the respective flight to determine at least one notification for the aircraft, and the output is configured to output the notification via the user interface.

5. The computing device of claim 1, wherein the group of aircraft status reports comprise at least two aircraft status reports generated between engine start and engine shutdown of the aircraft with at least one aircraft status reporting being generated after takeoff.

6. The computing device of claim 1, wherein the processor is further configured to predict a location of the respective aircraft from takeoff to landing with respect to the flight based on previous flights, and compare the predicted location and time to a location and a time stamp included in each of the received aircraft status reports to determine the group of aircraft status reports generated by the respective aircraft during the respective flight.

7. The computing device of claim 1, wherein the processor is further configured to identify an aircraft status report that is missing from the determined group of aircraft status reports generated by the respective aircraft, and the output is further configured to output an indication of the missing aircraft status report via the user interface.

8. The computing device of claim 1, wherein the user interface provides a search bar or a query input to allow a user to look for status reports related to a particular flight or a particular aircraft.

9. The computing device of claim 1, wherein the aircraft status reports are arranged in the order they were generated.

10. The computing device of claim 1, wherein each of the received aircraft status reports comprises data about the aircraft including aircraft weight or aircraft speed and data about the environment or space including the aircraft.

11. A method for linking aircraft status reports, the method comprising:
receiving aircraft status reports provided by a plurality of aircraft, respectively;
detecting, via a user interface, a selection of an aircraft from among the plurality of aircraft that provided the aircraft status reports;
determining a group of aircraft status reports, from among the received status reports, that were generated by the respective aircraft during a flight of the respective aircraft, based on metadata of the received aircraft status reports;
displaying, via the user interface, the group of aircraft status reports determined to be provided by the respective aircraft during the flight; and
wherein the metadata of each aircraft status report comprises a time stamp, a departure location, and an arrival location, and the determining comprises determining the group of aircraft status reports generated by the respective aircraft during the respective flight based on locations and time stamps of the received aircraft status reports.

12. The method of claim 11, wherein the group of aircraft status reports comprise a plurality of status reports generated and provided by the respective aircraft between engine start of the aircraft and an engine shutdown of the aircraft with respect to the flight.

13. The method of claim 11, wherein the displaying comprises grouping together the group of aircraft status reports generated by the respective aircraft during the respective flight on the user interface beginning with a first received aircraft status report of the flight to a last received aircraft status report of the flight.

14. The method of claim 11, further comprising comparing data from the group of aircraft status reports generated by the respective aircraft during the respective flight to determine at least one notification for the aircraft, and outputting the notification via the user interface.

15. The method of claim 11, wherein the group of aircraft status reports comprise at least two aircraft status reports generated between engine start and engine shutdown of the aircraft with at least one aircraft status reporting being generated after takeoff.

16. The method of claim 11, wherein the determining further comprises predicting a location of the respective aircraft from takeoff to landing with respect to the flight based on previous flights, and comparing the predicted location and time to a location and a time stamp included in each of the received aircraft status reports to determine the group of aircraft status reports generated by the respective aircraft during the respective flight.

17. The method of claim 11, further comprising identifying an aircraft status report that is missing from the determined group of aircraft status reports generated by the respective aircraft, and outputting an indication of the missing aircraft status report via the user interface.

18. A non-transitory computer readable medium having stored therein instructions that when executed cause a computer to perform a method for linking aircraft status reports, the method comprising:
receiving aircraft status reports provided by a plurality of aircraft, respectively;
detecting, via a user interface, a selection of an aircraft from among the plurality of aircraft that provided the aircraft status reports;
determining a group of aircraft status reports, from among the received status reports, that were generated by the respective aircraft during a flight of the respective aircraft, based on metadata of the received aircraft status reports;
displaying, via the user interface, the group of aircraft status reports determined to be provided by the respective aircraft during the flight; and
wherein the metadata of each aircraft status report comprises a time stamp, a departure location, and an arrival location, and the determining comprises determining the group of aircraft status reports generated by the respective aircraft during the respective flight based on locations and time stamps of the received aircraft status reports.

19. The non-transitory computer readable medium of claim 18, wherein the group of aircraft status reports comprise a plurality of status reports generated and provided by the respective aircraft between engine start of the aircraft and engine shutdown of the aircraft with respect to the flight.

20. The non-transitory computer readable medium of claim 18, wherein the displaying comprises grouping together the group of aircraft status reports generated by the respective aircraft during the respective flight on the user interface beginning with a first received aircraft status report of the flight to a last received aircraft status report of the flight.

* * * * *